US008303413B2

(12) United States Patent
Geist, Jr. et al.

(10) Patent No.: US 8,303,413 B2
(45) Date of Patent: Nov. 6, 2012

(54) LIVE HOSTING TOOLSET (75) Inventors: James F. Geist, Jr., Issaquah, WA (US);
Tara J. Brannigan, Edmonds, WA (US);
Joanne L. Clowes, Redmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/163,366

(22) Filed: Jun. 27, 2008

(65) Prior Publication Data
US 2009/0325706 A1 Dec. 31, 2009

(51) Int. Cl.
A63F 9/24 (2006.01)
A63F 13/00 (2006.01)
(52) U.S. Cl. .................... 463/40; 463/1; 463/41; 463/42
(58) Field of Classification Search ............ 463/1, 4–420
See application file for complete search history.

(56) References Cited

U.S. PATENT DOCUMENTS

| | | | |
|---|---|---|---|
| 6,908,390 B2 | 6/2005 | Nguyen et al. | |
| 6,928,329 B1 | 8/2005 | Giaimo et al. | |
| 2002/0034980 A1 | 3/2002 | Lemmons et al. | |
| 2002/0090990 A1* | 7/2002 | Joshi et al. ...................... | 463/20 |
| 2006/0058103 A1 | 3/2006 | Danieli et al. | |
| 2006/0258446 A1 | 11/2006 | Nguyen et al. | |
| 2007/0117635 A1 | 5/2007 | Spanton et al. | |
| 2007/0167236 A1 | 7/2007 | Heckendorf, III et al. | |
| 2007/0235932 A1 | 10/2007 | Karwat Singer et al. | |
| 2008/0015003 A1 | 1/2008 | Walker et al. | |
| 2008/0039203 A1 | 2/2008 | Ackley et al. | |
| 2008/0076527 A1* | 3/2008 | Low et al. ........................ | 463/25 |
| 2008/0146342 A1* | 6/2008 | Harvey et al. ................... | 463/42 |

OTHER PUBLICATIONS

Guangyu Zhu, Automatic Multi-Player Detection and Tracking in Broadcast Sports Video Using Support Vector Machine and Particle Filter, Jul. 2006, pp. 1629-1632, Multimedia and Expo 2006 IEEE International Conference.
Brad Cook, Multiplayer Online Gaming, Copyright 2008 Apple, Inc., http://www.apple.conn/games/gettingstarted/multiplayer/.
Gopal Sarma Pingali, Real Time Tracking for Enhanced Tennis Broadcasts, Proceedings of the IEEE Computer Society Conference on Computer Vision and Pattern Recognition, 1998, p. 260, IEEE Computer Society, Washington, DC, USA.

* cited by examiner

Primary Examiner — Peter DungBa Vo
Assistant Examiner — Jasson Yoo
(74) Attorney, Agent, or Firm — Vierra Magen Marcus & DeNiro LLP (57) ABSTRACT Tools available to a live host for interacting with player of a live broadcast game show. One tool set receives performance data associated with the featured player and the other players, displays to the live host the performance data associated with the featured player and the other players, and allows the live host to broadcast live audio to the featured player and the other players. Another tool set aggregates statistical information associated with the other players participating in the live broadcast game show into multiple categories and ranks the statistical information. Based on at least one category, one of the other players is selected to be the next featured player. The selection is broadcast to the other players.

5 Claims, 8 Drawing Sheets

LIVE HOSTING TOOLSET

BACKGROUND

Gaming systems have evolved from those which provided an isolated gaming experience to networked systems providing a rich, interactive experience which may be shared in real time between friends and other gamers. With Microsoft's Xbox® video game system and Xbox Live® online game service, users can now easily communicate with each other while playing to share the gaming experience.

Users can track their own and their friends' progress through different games is through the concept of game scores and achievements. Another innovation in current gaming systems is the ability to quickly and easily download games. For example, Microsoft introduced a gaming disc known as Microsoft Arcade which is able to connect to a server through the Internet when the gaming console is connected to the Internet. From the server site, the Arcade gaming disc is able to enumerate full version games which are available for download to the user's hard disc drive on the XBOX® console.

Large scale or "massively multiplayer" games allow large numbers of players to interact. Currently, console games are generally limited to multi-user games hosted by one of the console users.

Many games seek to inject "realistic" commentary into the gameplay. This commentary typically includes pre-recorded content stored with the game which is accessed and presented to the user at appropriate events in the game or when the state of the game reaches a certain point. After playing the game for some time, this pre-recorded content becomes stale and repetitive.

SUMMARY

One aspect of the present technology is to provide a toolset that allows a live host to interact with the players of a live broadcast game show. In one embodiment of a game show, the players comprise a featured player competing against multiple other participants. The toolset receives performance data associated with the featured player and the other participants. The toolset displays to the live host the performance data associated with the featured player and the performance data associated with the other participants. At any point during the game show, the live host broadcasts live audio related to the game show to the featured player and the other participants.

One aspect of the present technology is to inform the live host that participants are losing interest in the live broadcast game show. A method monitors the total number of players participating in the live broadcast game show and displays the number of players to the live host. In one embodiment, the method updates the number of players participating in the gamshow to the live host at predetermined intervals. In another embodiment, the method updates the number of players participating in the gamshow to the live host in real-time. The method determines whether the players are losing interest in the game show based on the number of players that have left the game show. The method includes displaying new content to the live host. The live host may provide this new content to the players at the next opportunity in the game show.

One aspect of the present technology is to allow the live host to select the next featured player in the live broadcast game show. The live broadcast game show, in one embodiment, includes several rounds of trivia questions. For each round, statistical information associated with the players participating in the game show is collected and ranked. A portion of this ranked statistical information is displayed to the live host. At the end of a round, the live host may choose the next featured player for the next round. The live host may choose the next featured player based on any of the statistical information displayed to the live host.

DETAILED DESCRIPTION

The technology described herein is a toolset made available to a live host managing the gameplay of a live broadcast game show. The toolset organizes game statistics of each player participating in the game and presents these statistics to the live host. The toolset allows the live host to provide live commentary to the players and dynamically alter the gameplay. The live host may control certain aspects of the gameplay by, among other things, interrupting pre-recorded audio to broadcast live audio commentary, changing the subject matter of the next trivia question presented to the players (in a trivia game embodiment), and selecting the next featured player.

Figure 1:
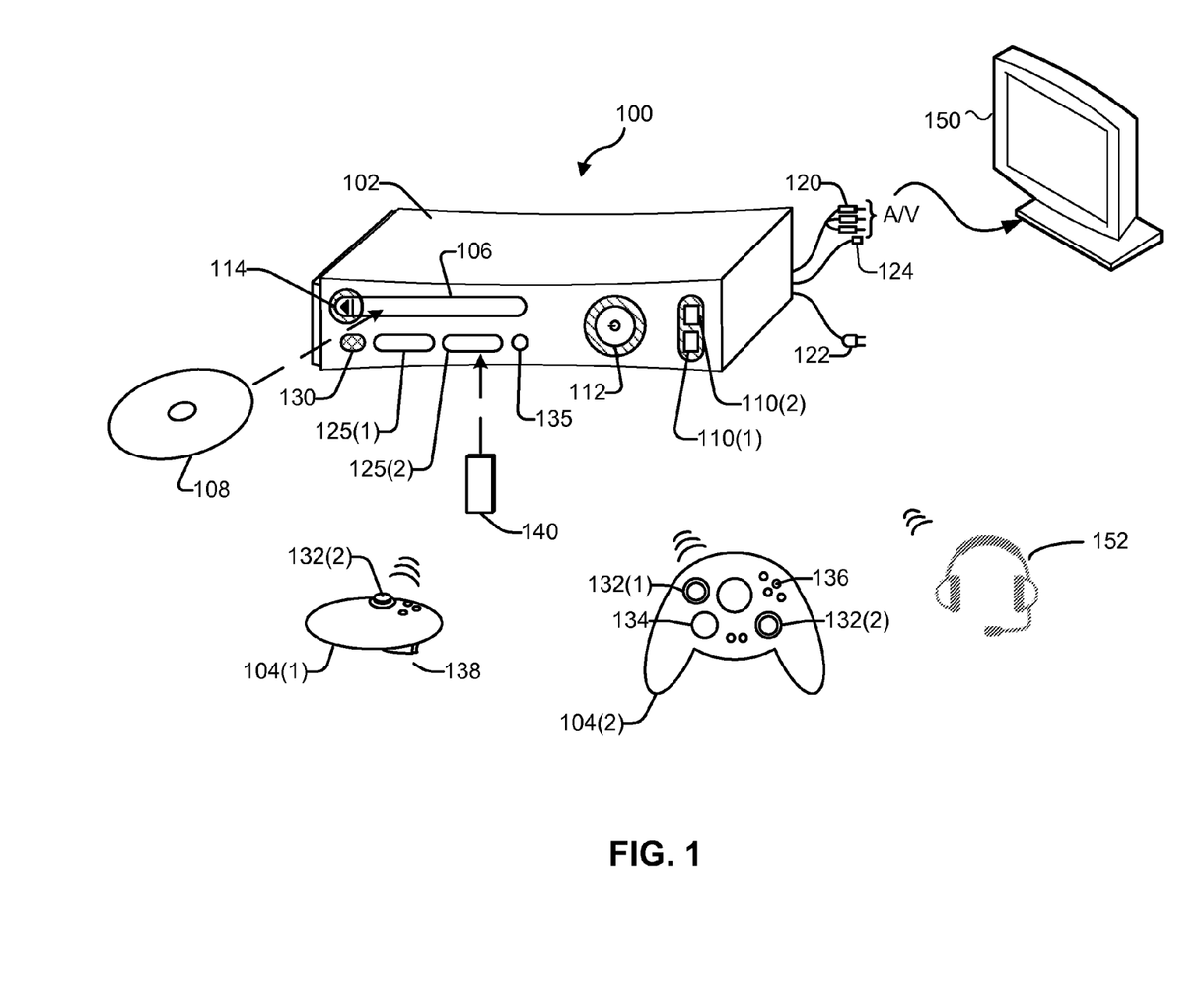
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1. In one embodiment, headphones 152 are also coupled to console 102 via a wired or wireless interface. The headphones 152 allow the user to talk with other users playing the same game or, for example, talk with the live host 352.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. Samples of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
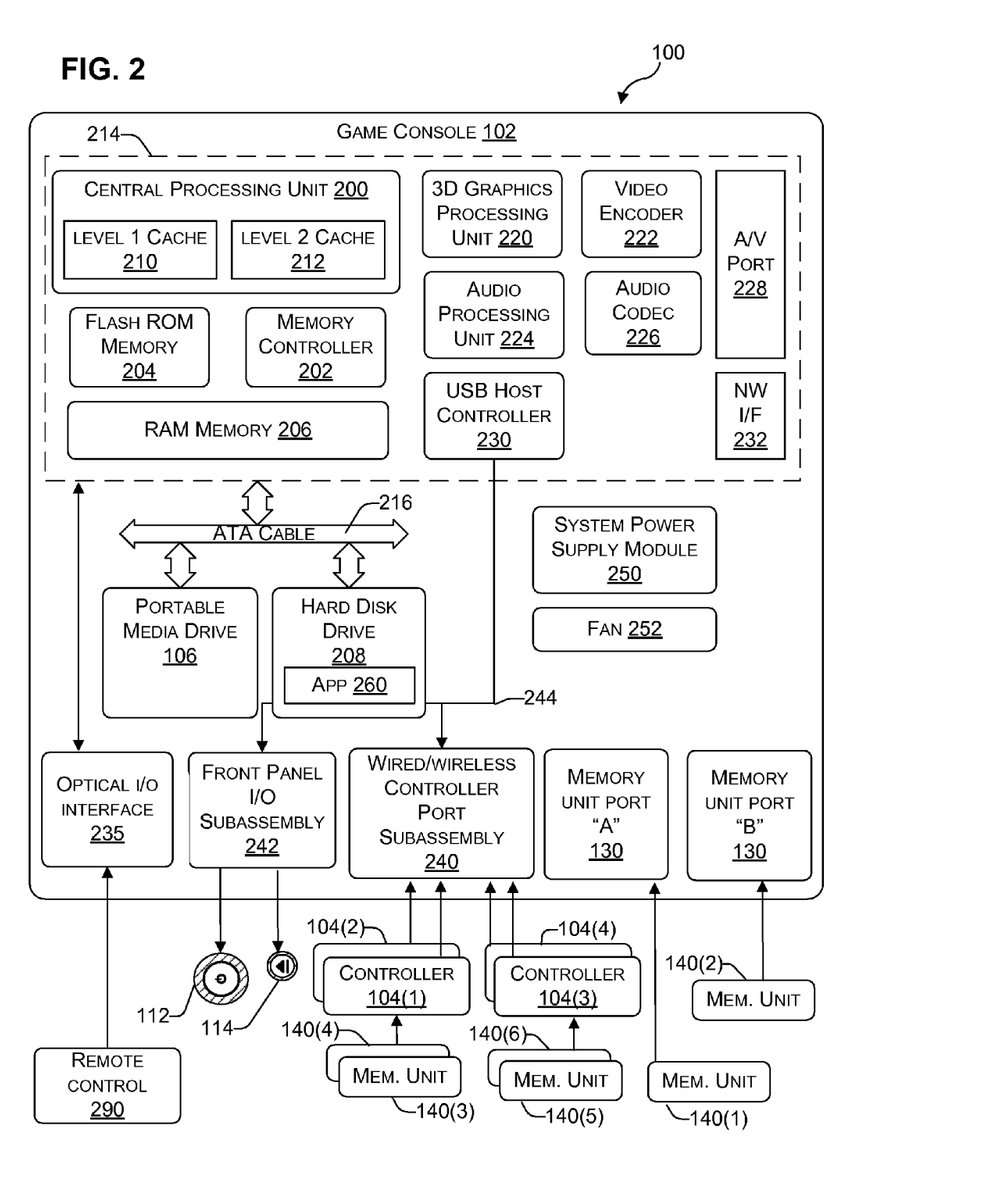
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
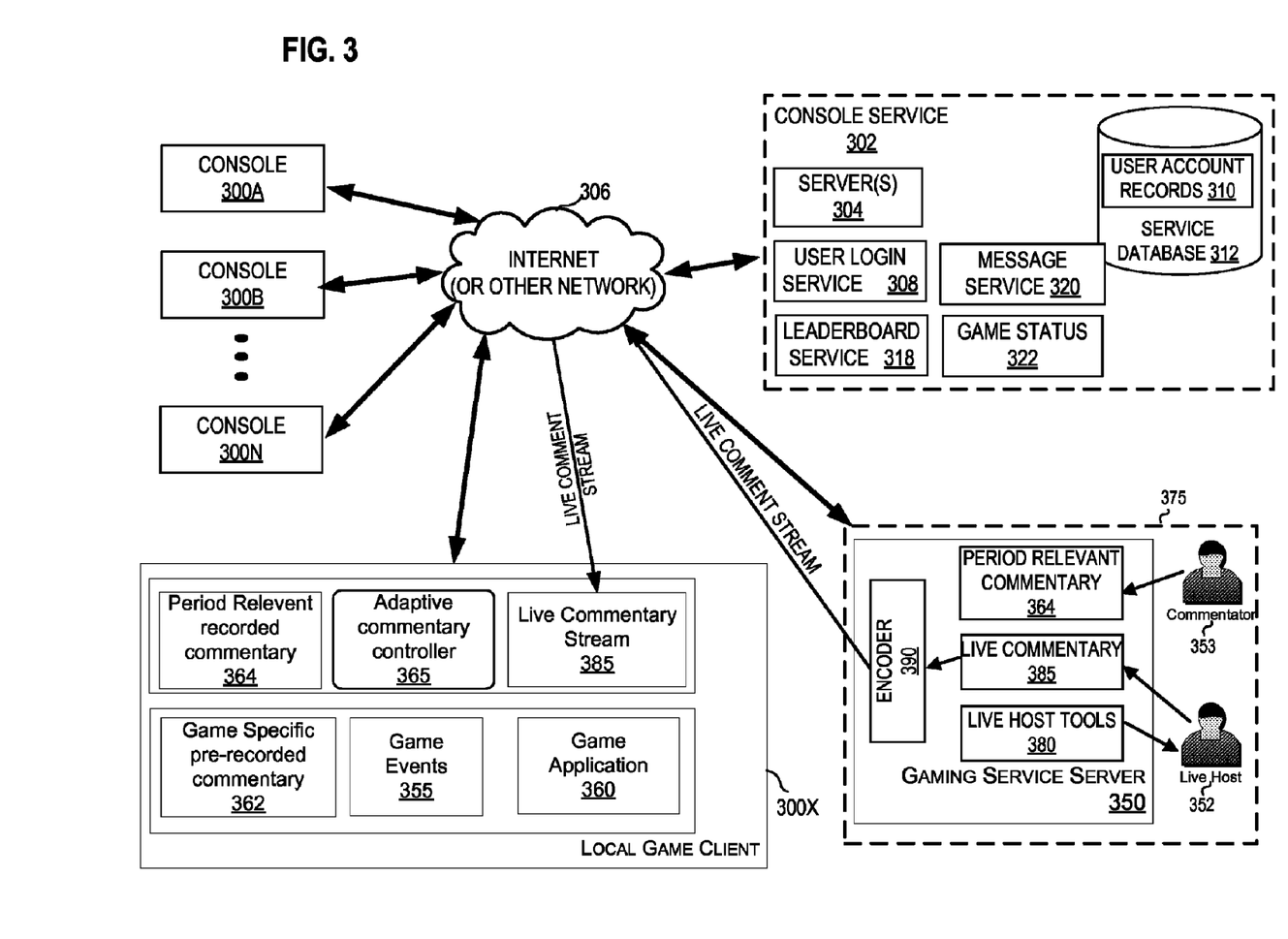
FIG. 3 is a block diagram of an exemplary operating environment for rendering achievement information.

FIG. 3 provides a block diagram of an environment for implementing the present technology. In one example, multiple consoles 300A-300X are coupled to a network 306 and can communicate with a console service 302 having one or more servers 304 through network 306. Also present and coupled to the network is a gaming service provider 350 and one or more gaming service servers 375. In one embodiment, network 306 comprises the Internet, though other networks such as LAN or WAN are contemplated. Server(s) 304 include a communication component capable of receiving information from and transmitting information to consoles 300A-X and provide a collection of services that applications running on consoles 300A-X may invoke and utilize.

The console service 302 and the gaming service 375 may be combined and offered by a single service provider and/or on a single server. Alternatively, the service providers may be different entities. In yet another embodiment, the gaming service server may be provided as a product in the form of hardware and software included on a non-volatile storage medium.

Consoles 300A-X may invoke user login service 308, which is used to authenticate a user on consoles 300A-X. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records and friends list. Game records 314 include information for a user identified by a gamer tag and can include statistics for a particular game, achievements acquired for a particular game and/or other game specific information as desired.

Friends list 316 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

Friends list 316 can be used to create a sense of community of users of console service 302. Users can select other users to be added to their friends list 316 and view information about their friends such as game performance, current online status, friends list, etc.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include a message service 320 which permits one console, such as console 300A, to send a message to another console, such as console 300B. The message service 320 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

In accordance with the technology, a gaming service provider 375 may host a gaming service server 350 to allow a multitude of users on consoles 300A-300X participate in a group game environment. The group may be as small as two users and may include hundreds of thousands of users. The gaming service server 350 obtains game data and state information from the console service, which it uses to provide information to a live host 352 and period relevant commentator 353 which in turn provides information back to a local game client 300X. It will be understood that the gaming service provider 375 and the console service 302 may be integrated into a single service. Alternatively, the gaming service 375 may not be managed by the same administrator of the console service 302.

The gaming service provider 375 employs live individuals comprising a live host and a period relevant commentator 353. In one embodiment, the live host and the period relevant commentator may be the same individual. Gaming service provider 375 operates one or more gaming service servers. The gaming service server includes a set of live host tools 380 which aggregate information from the console service with respect to game status for those users participating in a group game. Generally, the gaming service provider 375, in conjunction with the game application 360 and the commentary controller 365, provides true live commentary to a user running the game application on consoles 300A-300X. The commentary controller may be incorporated into the operating system of the console, or may be a separate application running on the console, having an application programming interface (API) which is accessible by game applications 360 designed to work with a gaming service 375 and the commentary controller 365. Generally, the commentary controller chooses amongst available commentary types, including live commentary specific to each shared game, to provide a live commentary experience for those users who are members of a group game hosted by the gaming service provider 375.

Console 300X illustrates functional components which may be present on each of the consoles 300A-300X. Each console may be of a type such as that illustrated in FIGS. 1 and 2, in which embodiment the functional components may comprise one or more sets of instructions or applications instructing the processor 200 to perform the functions described herein.

In general, three types of commentary are available to a game application 360: game specific pre-recorded commentary 362; period relevant recorded commentary 364 and live commentary 385. Game specific pre-recorded commentary is pre-recorded commentary which accompanies a game application 360 which is generated by game events 355 which occur in an executing game application 360 and which the application plays to a user to simulate commentary on the game. It generally comprises a bank of audio that uses random seeds and weightings to select an audio clip from a database and play it in the experience to appear somewhat live. Generally this commentary is scripted purely to the experience and does not contain references to real life events, unless the game is somewhat period set so that it can be contextually relevant. Examples of this kind of commentary today exist in sports games with the commentator announcing the plays and players names, game variables my weight the exact phrase chosen to allow for the excitement when a player is nearing scoring or a win/loss situation. For example, when the game application is a golf game and the user makes a particularly close shot, game specific pre-recorded commentary may indicate "good shot" from a "professional" announcer who simulates a broadcast announcer to the user. Normally, there are a limited number of game specific pre-recorded commentaries which can be returned to the user and after a certain number of repetitions of the game, the user exhausts all of the game specific pre-recorded commentary.

In accordance with the present technology, two additional types of commentary are provided. Period relevant recorded commentary 364 is commentary which is recorded by the game service provider 375 based on information which is temporally relevant to the game. Period relevant commentary brings in temporally relevant events which may have occurred in the news relative to the game. Examples of this type of commentary include, in the case of the sports game example, reference to player's current stats in the real world, something going on in the players life off the field, or general news worthy items that may be relevant to the sport or game activity. For example the commentary may reference a player's girlfriend or that they had just broken up and it may be impacting their play on the field. In the above golf game example, if one of the golfers participating in the game as simulating, for example, a professional golfer, and the professional golfer recently won a tournament, period relevant commentary may insert a comment relating to this recent tournament win at an appropriate point in the game application. This type of commentary includes temporally relevant real world events having a relation to the game experience. In accordance with the technology, a period relevant commentator 353 records period relevant commentary at regular intervals and the period relevant commentary may be downloaded to the local game client by the adaptive commentary controller 365 at appropriate intervals. Period relevant commentary 364 may also reference or include, by way of example only, a previously recorded interview conducted by the live host 352 with the featured player.

The third type of commentary available to the game application 360 is a live commentary stream 385. A live commentary stream 385 is generated by a live host 352 employed by the gaming service provider 375. Using live host tools 380, a live host 352 can monitor the status of a group game, and provide live commentary which is converted to a stream of audio information by encoder 390 and streamed directly to a local game client 385. The live commentary stream is truly live commentary which allows a live human being to add comments into the game play experience that may call out a particular players performance by gamer tag, or add color commentary to team play, such as saying that the East coast is outperforming the West coast on a particular question in a trivia game. In one embodiment, the encoder 390 outputs the stream in Windows Media Audio format.

Commentary provided by the live host 352 can take many forms. In one example, the live host can monitor the status of a golf game between, for example, a user on console 300A and a user on console 300X. If one of the users makes a particularly good shot in a golf game, and that user is trailing in a golf match, the live commentator can note this fact and comment on the fact that the good shot will increase the trailing user's chances of catching up in the match. In this example, two users are described as playing a golf game.

An alternative embodiment exists where a larger number of consoles and users are participating in a hosted game event. In this case, because the number of users is exceeding large, the live host tools 380 will aggregate game status information 320 provided by the console service into more generalized categories for the live host 352. In this example, the live host 352 can initiate commentary which is relevant to certain groups of users or trends which may be occurring within the game. In one example, a quiz show game may pit one user against a multitude of users, asking both the multitude and the individual user a question with the results of game play determined on the success of the individual user versus the multitude of users. The live host tools 380 can aggregate, for example, age groups of people in the group game who were successful or unsuccessful in answering a question, how successful people in a particular geographic region were in answering the question, or other factors which may be of interest to those people playing the game. Commentary can then be generated which notes particular game trends by region or age group, or other items of interest to a level reflecting achievements of individual users in the current game or other games.

Live commentary by the live host 352 will be recorded and encoded by encoder 390 and output as a stream which is available to the local game clients 300A-300X. As discussed below, when game events 355 indicate that commentary is desirable for the executing game application 360, the adaptive commentary controller will choose between live commentary, period relevant commentary, or game specific pre-recorded commentary based on a number of factors.

The technology herein will be described below in reference to a live broadcast quiz game show. A live broadcast quiz game show is an online trivia game where one player (referred to as the "featured player") competes against other players (also referred to as "participants") from around the world, answering questions presented to the featured player and other participants. The quiz game show is broadcast, for example, from a game studio (e.g., gaming service provider 375) over the Internet during specific broadcast times (e.g., every weekday between 11:30 am-12:00 pm). During the scheduled broadcast times, the trivia game is hosted live. Working from a centralized location with minimal studio production needs, the live host 352 may use the host tools 380 to manipulate the direction of the game and inject relevant commentary to create a more emotionally charged real-time show experience. The technology described herein is not limited to a trivia game.

Figure 4:
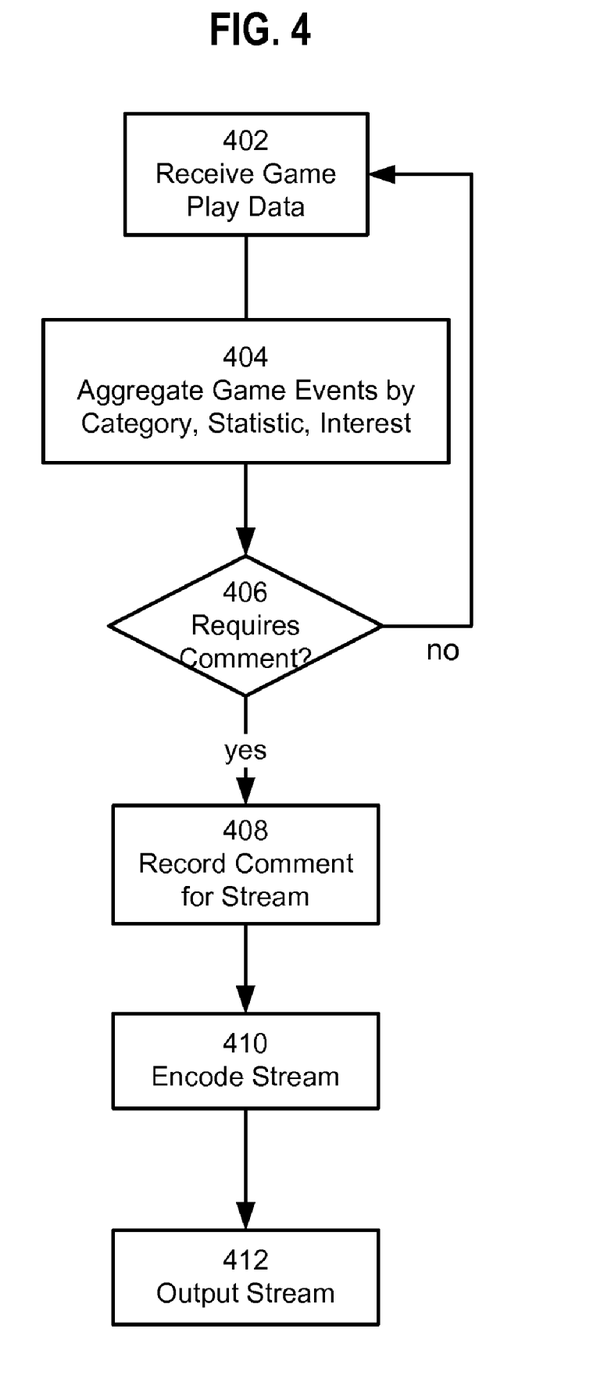
FIG. 4 depicts a flow diagram providing exemplary steps for providing aggregated game information to a live host.

FIG. 4 illustrates a method performed by the live host tools 380 to provide information to a live host 352. At step 402, game play data is received from the console service 302. The game play data can include specific events, or game state information by an individual user or for the aggregate of all users participating in the hosted game provided by the gaming service provider 375. Filtering of the information provided to the gaming service provider 375 can occur by the console service 302, or by the gaming service provider 375.

Figure 5:
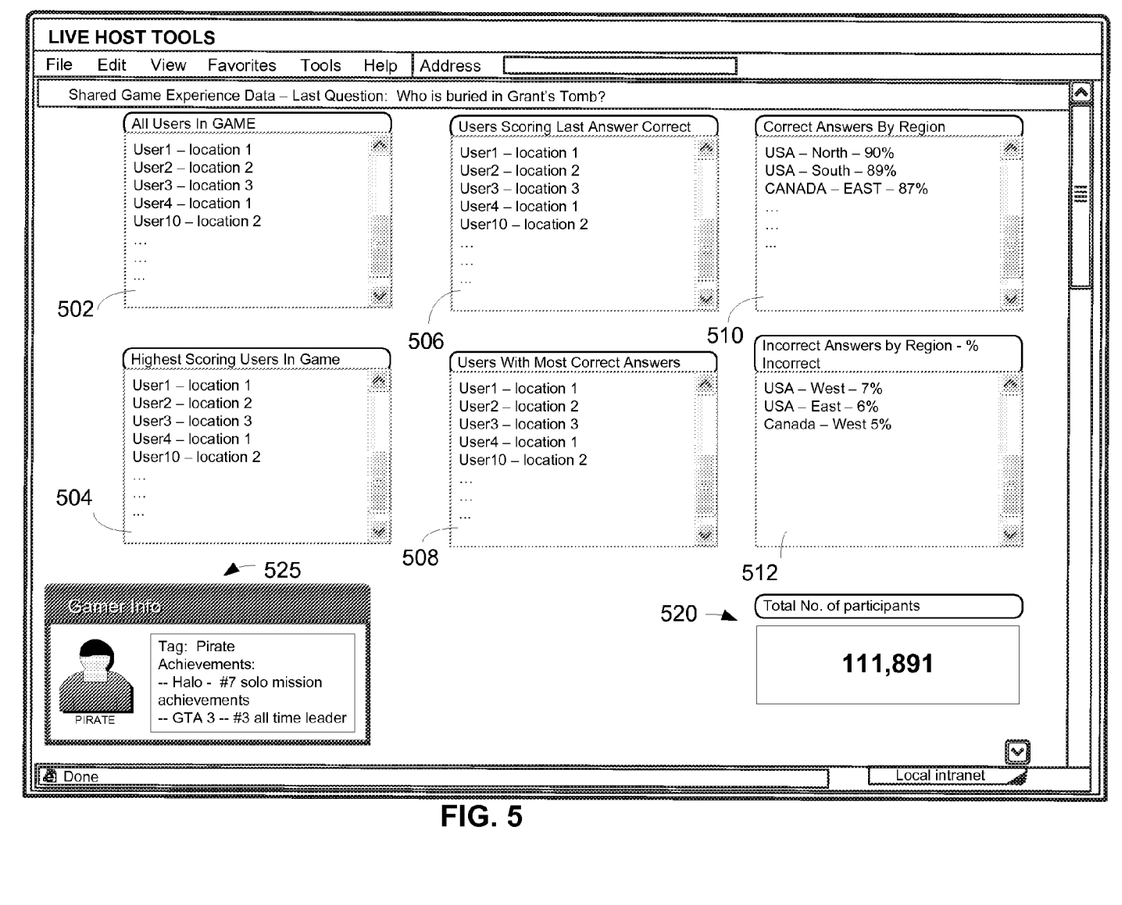
FIG. 5 depicts one embodiment of a user interface for live hosting tools.

At step 404, the live host tools 380 aggregate game events and game status by, for example, category, statistic, or common interest for participants in the group. For example, geographic information regarding the game play of users in a particular geographic region, users for a particular age group, or other common factors may be aggregated into statistical output and provided to the live host 352. FIG. 5 (described in more detail later) provides examples of game events and game status information.

At step 406, a determination is made as to whether any of the factors, or aggregate data, should generate commentary from the live host 352. If the live host 352 determines that a comment is suitable, then at step 408, the live host 352 will provide a comment into the live data stream. At step 410, the stream is encoded into, for example, WMA format or other suitable formats, and output into a stream via the network at step 412. The stream can be directed to a particular port on the console and the adaptive commentary controller can seek the stream at any of the aforementioned steps when a live comment is necessary from the stream.

In certain situations, the content provided into the live commentary stream may be provided from alternative sources. For example, the console service provider may seek to interject service notifications into the stream, or an advertiser may seek to input advertisements into the live commentary stream. The live host 352 may broadcast live audio to only the featured player or simultaneously to all players. The live host 352 may decide to broadcast live audio for several reasons. The live host 352 may comment on actions taken by the featured player such as, but not limited to, how fast the featured player answered a trivia question, the featured player has decided to "cash out" or the featured player reaches a milestone (e.g., answered 5 questions correctly in a row). The live host 352 may also comment on how many players are currently playing the game, acknowledge one of the players with the current high score or, acknowledge a certain player climbing up the scoring ranking. The live host 352 may also decide to provide commentary related to the current trivia question such as, but not limited to, provide tips to the answer or provide facts about subject matter of the question.

Figure 6:
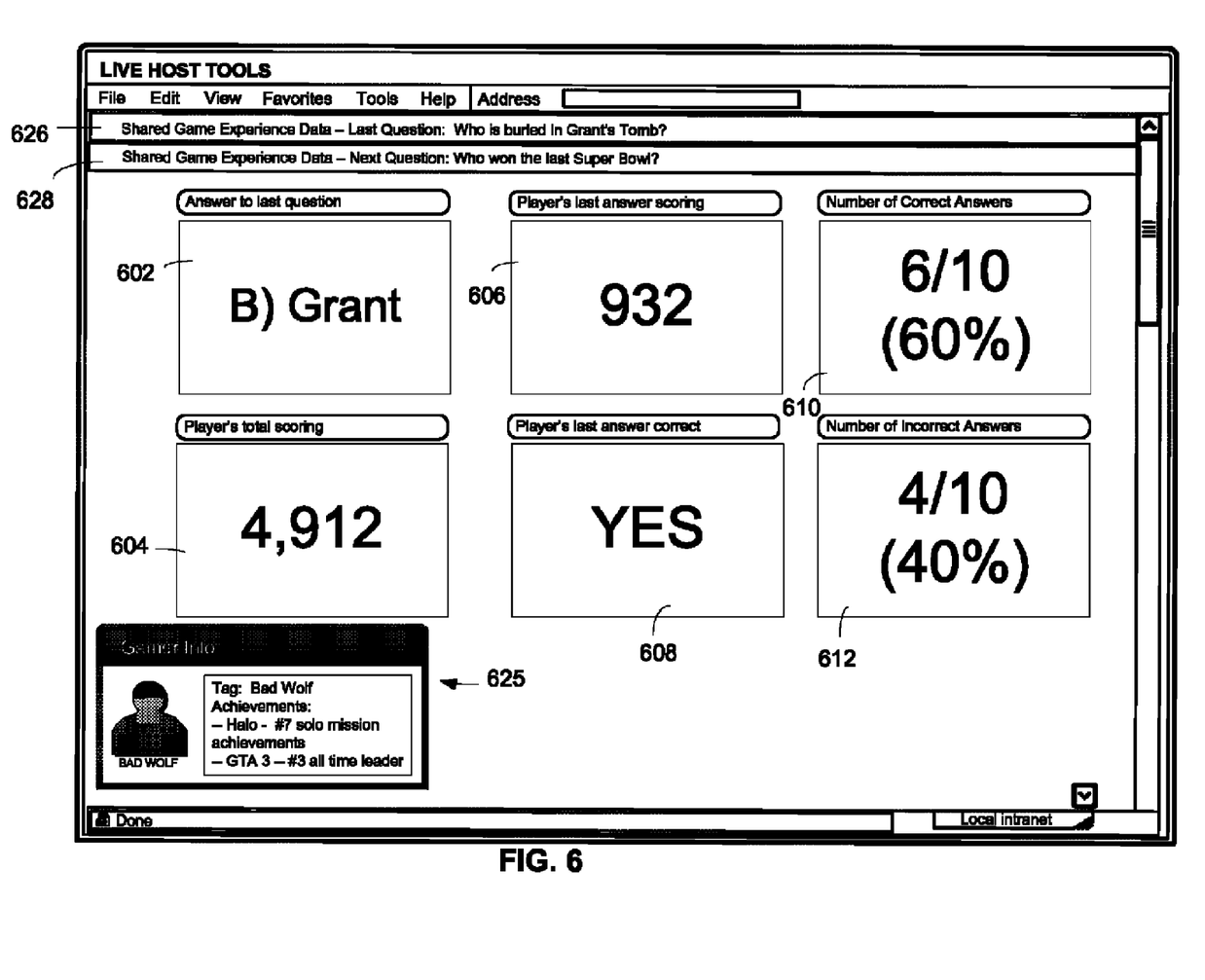
FIG. 6 depicts another embodiment of a user interface for live hosting tools.

In a television game show, most of the comments provided by the game show host are focused on the contestant. In order for the live host 352 to provide comments about a featured player playing an online game, the live host 352 requires access to as much information about the featured as possible. As shown in FIGS. 5-6, a higher detail of data associated with the featured player data is displayed to the live host 352 (FIG. 6) than data associated with the other players (FIG. 5).

FIG. 5 is a user interface illustrating the output of the live host tools 380 that may be presented to a live host 352. As indicated in FIG. 5, the live host 352 may be presented with a number of different data sets which are aggregates of information provided by the live host tools 380 as a result of the game status information 320. For example, in FIG. 5, the live host 352 has access to a list of all the individual users in a game (502), those users which are the highest scoring users in the game (504), those users scoring the last answer correctly (506), the users with the most correct answers (508), the correct number or percentage of answers by a particular geographic region (510), and the incorrect percentage of answers by a particular geographic region (512). Additionally, a the live host 352 may select one of the individual users listed in any of the aforementioned data sets 502, 504, 506, 508, 510, 512, and obtain additional information regarding the individual at view pane 525. The information displayed in the view pane 525 may indicate, but is not limited to, the user's individual tag name, the individual's avatar, personal information and specific achievements which are saved in the user account records 310 of the console service. The user interface, in this embodiment, also displays the total number of other players participating in the round. By way of example only, a "snapshot" of the total number of players is taken between trivia questions. All this information can be utilized to generate comments which result in commentary being provided into the stream.

FIG. 6 is a user interface illustrating the output of the live host tools 380 that may be presented to the live host 352, specific to the featured player. As indicated in FIG. 6, the live host 352 may be presented with information specific to the featured player provided by the live host tools 380 as a result of the game status information 320. For example, in FIG. 6, the live host 352 has access to the answer provided by the featured player to the last question (602), the total score of the featured player (604), the score achieved by the last answer provided by the featured player (606), whether the last answer provided by the featured player was correct (608), the number (and percentage) of correct answers provided by the featured player in this round (610), and the number of incorrect answers provided by the featured player in this round (612). The live host 352 may also find out if the featured player has additional achievements in other games or view personal information about the featured player, in the view pane 625. All this information can be utilized to generate comments related specifically to the featured player which result in commentary being provided into the stream.

Figure 7:
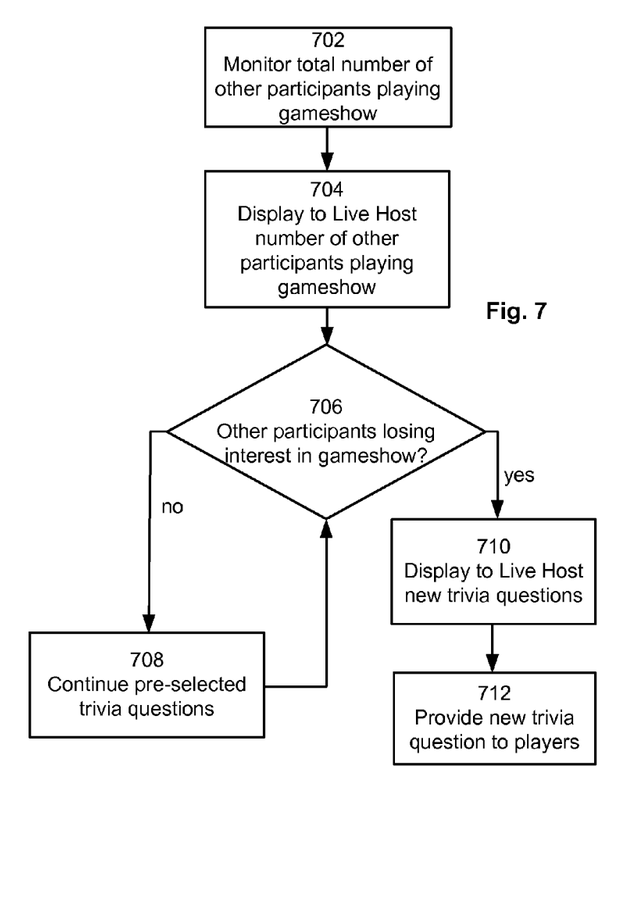
FIG. 7 depicts a flow diagram providing exemplary steps for informing a live host if the participants are losing interest in the live broadcast game show.

FIG. 7 illustrates a method performed by the live host tools 380 to inform the live host 352 whether the other participants are losing interest in the live broadcast quiz game show. The popularity of an online game is often measured by the number of players simultaneously playing the game (similar to how large the audience is watching a television game show). The more people playing the game at the same time, the more popular the game. As discussed above, the trivia questions for the round are pre-selected. If a player becomes bored with the subject matter of the trivia questions, the player may decide to leave the game before the round has ended (e.g., by closing their Internet connection). The ability to monitor the number of players participating in the game show allows the live host 352 to maintain a high level of player participation by changing questions if the players get bored.

At step 702, the live host tools 380 monitor the number of other participants playing the live broadcast game show. In one embodiment, the number of other participants playing the game show is monitored in real-time. In another embodiment, a periodic "snapshot" of the number of players playing the game show is taken at pre-determined intervals (e.g., every 10 seconds, every 30 seconds, every minute, etc.).

At step 704, the number of players playing the live broadcast game show is displayed to the live host 352. If the monitoring at step 702 is in real-time, the number of other participants playing the game show is displayed to the live host 352 in real-time. If the monitoring conducted at step 702 is a "snapshot" at pre-determined intervals, the number of other participants playing the game show is updated and displayed to the live host 352 after each "snapshot" is taken.

At step 706, it is determined whether the players are losing interest in the round of trivia. In one embodiment, the live host 352 makes the decision whether the number of players leaving the game show indicates that players are losing interest in the game show. If there are, for example, 50,000 players participating in the game show, 100 players leaving the game show at any given time would likely not indicate to the live host 352 that players are losing interest in the game show. On the other hand, if the live host 352 notices that 5,000 players have left the game show (by watching the number of players displayed in step 704), the live host 352 may interpret this large drop in participation as an indication that players are losing interest in the game show. In an alternative embodiment, a predetermined percentage of players dropping out of the game show will indicate that players are losing interest in the game show. By way of example only, the live host tools 380 can be set so that a certain percentage drop in players indicates that players are losing interest in the game show and an automatic alarm or notification is sent to the live host 352.

If it is determined that players are not losing interest in the game show (step 706), the pre-selected trivia questions continue to be presented to the players, at step 708. In other words, the game show continues as scheduled. If, however, it is determined that the players are losing interest in the game show (step 706), new trivia questions are presented to the live host 352, in step 710. One or more new trivia questions may be presented to the live host 352 at this time. The new trivia questions are intended to renew the player's interest in the game show and prevent further players from leaving the game show early. The new trivia questions may be associated with a subject matter that is different from the subject matter of the pre-selected trivia questions (e.g., switch from sports to entertainment), may be easier to answer, or other changes to the questions may be made.

At step 710, the live host 352 selects one of the new trivia questions. At step 714, the new trivia question selected by the live host 352 is presented to the players. At this point, the trivia questions that were preselected for the round are discontinued. The trivia questions presented to the players for the rest of the round will be selected from the list of new trivia questions (step 710). In one embodiment, the live host 352 may choose each trivia question for the rest of the round. In an alternative embodiment, the live host 352 selects a group of trivia questions presented (e.g., entertainment group, current news group), and trivia questions from the selected group are presented to the players automatically.

Figure 8:
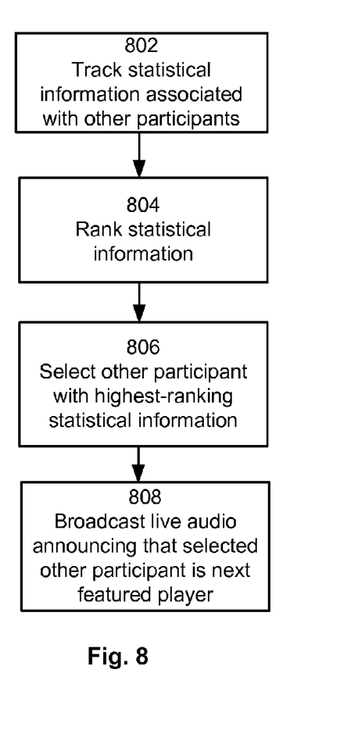
FIG. 8 depicts a flow diagram providing exemplary steps for selecting the next featured player in a live broadcast game show.

FIG. 8 illustrates a flow diagram of a method performed by the live host toolset 380 that allows the live host 352 to select one of the other players as the featured player for the next round of the game show. At step 802, statistical information associated with each other participant is tracked. The user interface shown in FIG. 6 illustrates several examples of the types of information that is tracked (e.g., highest score, most correct answers, etc.).

At step 804, the statistical information is ranked. By way of example only, each of the statistical or performance data is displayed in the ranked order. For example, in display 508, the users with the highest score are displayed in ranked order. At step 806, the live host selects a player ranked highest in one of the statistical categories. If the live host's selection is based on score, for example, the participant with the highest total score is selected (User1 in FIG. 5). If the selection is based on number of correct answers, the participant with the most correct answers is selected (User1 in FIG. 5).

At step 808, the live host 352 announces that the selected other participant is the next featured player for the next round (or any future round) of trivia questions. The live host 352 may choose to contact only the selected other participant to inform the player that they have been selected. The live host 352, after the participant accepts to be the featured player, could then broadcast the selection to all the players while waiting for the next round of trivia to begin. The live host 352 may also decide to broadcast the identity of the selected participant to all players similar to a radio show announcing that a listener has won a prize and should call the studio to claim the prize.

Figure 9:
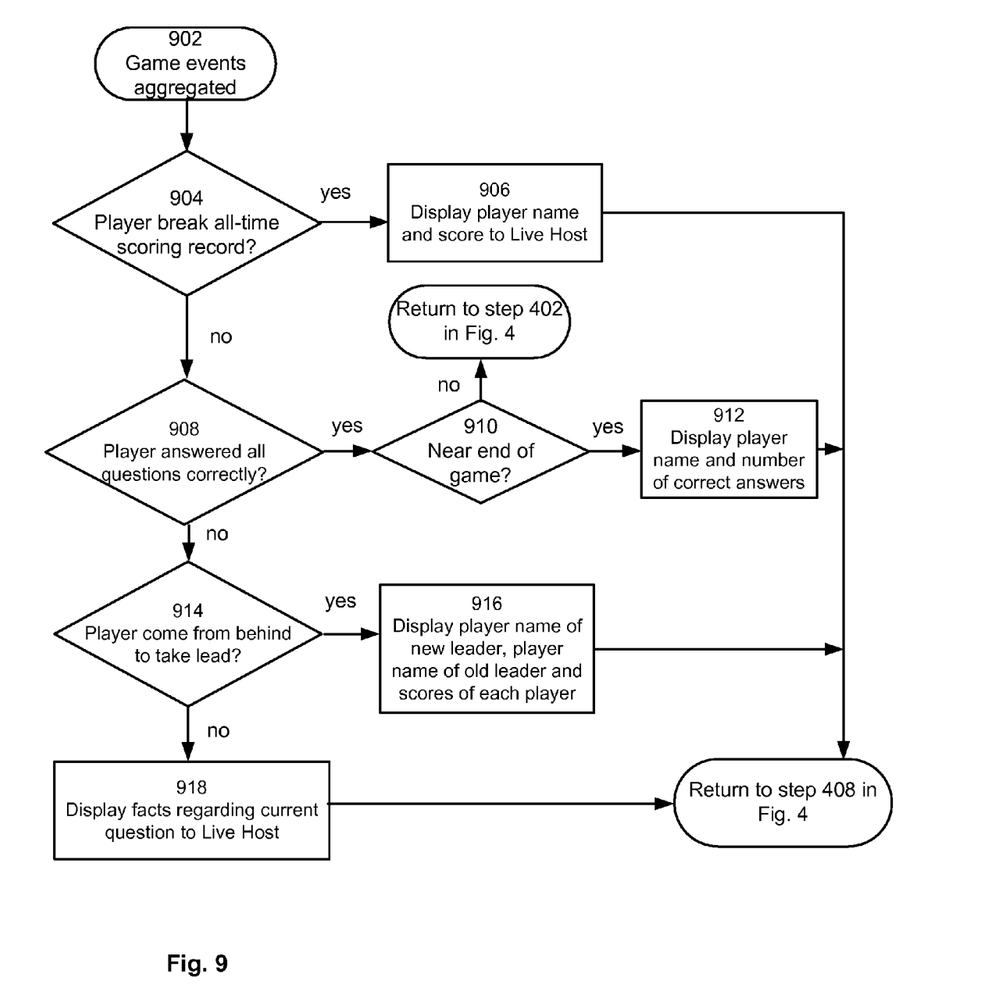
FIG. 9 depicts a flow diagram providing exemplary steps for displaying relevant game data to the live host.

As discussed above, the live host 352 may decide if a certain game event requires a comment (step 406). At step 902, the game play data has been received and aggregated. At step 904, a determination is made as to whether a player has broken the all-time scoring record. If it is determined that a player did break the scoring record, then, at step 906, the player's name (e.g., gamertag) and score are displayed to the live host 352 via the user interface. For example, a display box may appear in the user interface indicating the player's gamertag, score and a message "Broadcast high score to all players." If the scoring record has not been broken (904), it is determined whether a player has answered all the questions presented in the round correctly, at step 908. If a player has answered all the questions correctly, it is determined, at step 910, whether the end of the game is near. If the end of the game is near (e.g., only 2-3 questions left in the round of trivia), the player's name and the number of correct answers are displayed to the live host 352, at step 912. If the round of trivia is not about to end, the live host tools 380 continue to receive game play data (402). If no player has answered all the questions correctly, it is determined whether a new player has taken the scoring lead, at step 914. If a new player took the scoring lead (914), the gamertag of the new scoring leader, the gamertag of the prior scoring leader and the most recent scores associated with each gamertag are displayed to the live host 352, at step 916. If the scoring leader has not recently changed, facts relevant to the current questions are displayed to the live host 352, at step 918. The data 906, 912, 916 or 918 is displayed to the live host 352 for providing comments relevant to the displayed data into the live data stream (408). More then one type of data 906, 912, 916 and 918 may be displayed simultaneously to the live host 352. The live host 352 may choose to comment on any or all of the data displayed.

The foregoing detailed description of the technology described herein has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. In a live broadcast game show managed by a live host, a method for allowing the live host to alter the game play, comprising the steps of:
   (a) presenting a first round of trivia questions to a featured player and other players competing against the featured player, said first round of trivia questions are associated with a first subject matter;
   (b) monitoring periodically throughout the first round of trivia questions the total number of other players participating in the live broadcast game show;
   (c) displaying to the live host the total number of other players participating in the live broadcast game;
   (d) determining that the other players are losing interest in the live broadcast game show, said determining includes determining that a predetermined reduction in the total number of other players participating in the game show has occurred;
   (e) transmitting a notification to the live host by the processor indicating that the other players are losing interest in the live broadcast game show in response to determining that the predetermined reduction in the total number of other players has occurred;
   (f) displaying a second round of trivia questions to the live host when the predetermined reduction in the number of other players participating in the game show occurs, wherein the second round of trivia questions are associated with a second subject matter different than the first subject matter associated with the first round of trivia questions, wherein step (f) of displaying the second round of trivia questions comprises the steps of:
      (i) displaying to the live host new trivia question groups when the predetermined reduction in the number of other players has occurred; and
      (ii) prompting the live host to choose one of the new trivia question groups displayed in step (f)(i);
   (g) selecting by the live host at least one of the second round of trivia questions displayed in step (f); and
   (h) providing the at least one trivia question selected by the live host in step (g) to the featured player and the other players.

2. The method as recited in claim 1, wherein each new trivia group displayed in step (f)(i) includes multiple trivia questions associated with the second subject matter.

3. The method as recited in claim 1, wherein step (h) of providing the at least one trivia question comprises the step of:
   (i) displaying the trivia question selected in step (g) to the featured player and the other participants; and
   (ii) broadcasting live audio to the featured player and the other participants, wherein the live audio comprises the live host reading the trivia question selected in step (g).

4. One or more non-transitory processor readable storage devices having processor readable code stored thereon, said processor readable code programs one or more processors to perform a method comprising:
   displaying a first round of trivia questions to a featured player and other players competing against the featured player, said first round of trivia questions are associated with a first subject matter;
   monitoring periodically throughout the first round of trivia questions the total number of other players participating in the live broadcast game show;
   determining that a predetermined reduction in the total number of other players participating in the game show has occurred;
   displaying a second round of trivia questions to the live host when the predetermined reduction in the number of other players participating in the game show occurs, the second round of trivia questions associated with a second subject matter different from the first subject matter associated with the first round of trivia questions,
   wherein the step of displaying a second round of trivia questions further includes:
      displaying to the live host a set of new trivia questions when the predetermined reduction in the number of other players has occurred;
      prompting the live host to choose one of the new trivia questions displayed;
      receiving a response from the live host at least one of the new trivia questions displayed; and
      providing the at least one the new trivia questions to the featured player and the other players.

5. A system for managing a live broadcast game show, comprising:
   a network;
   a plurality of computing machines connected to said network;
   a live host connected to said network and in communication with said computing machines, said live host manages the live broadcast game show by interacting with a featured player and one or more other players competing with the featured player;

a set of live hosting tools connected to said network and in communication with said computing machines and said live host, said set of live hosting tools operable to:

provide a first round of trivia questions associated with a first subject matter to the featured player and other players, monitor periodically throughout the first round of trivia questions the total number of other players participating in the live broadcast game show, determine that a predetermined reduction in the total number of other players participating in the game show has occurred, display a second round of trivia questions associated with a second subject matter different from the first subject matter to the live host when the predetermined reduction in the number of other players participating in the game show occurs, wherein the set of live hosting tools displays the second round of trivia questions by prompting the live host to select at least one of the second round of trivia questions, and providing at least one of the second round of trivia questions to the featured player and other players in response to said live host selecting the at least one of the second round of trivia questions.

* * * * *